J. T. H. PATERSON.
VALVE CONTROLLED COUPLING.
APPLICATION FILED NOV. 17, 1917.
1,331,720.
Patented Feb. 24, 1920.
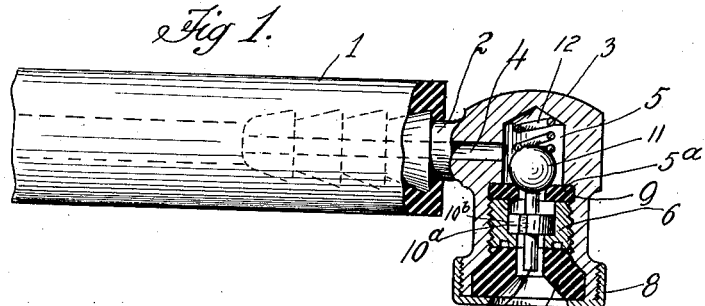
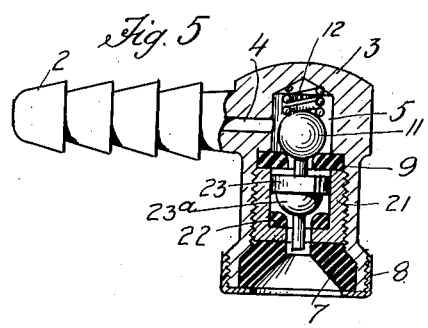
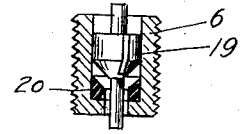
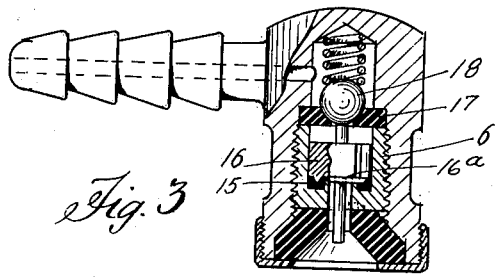
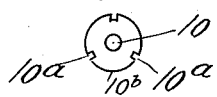
INVENTOR:
John T. H. Paterson.
BY
HIS ATTORNEY

UNITED STATES PATENT OFFICE.

JOHN T. H. PATERSON, OF CHICAGO, ILLINOIS.

VALVE-CONTROLLED COUPLING.

1,331,720.  Specification of Letters Patent.  Patented Feb. 24, 1920.

Application filed November 17, 1917. Serial No. 202,563.

*To all whom it may concern:*

Be it known that I, JOHN T. H. PATERSON, a citizen of the United States, residing at Chicago, in the county of Cook and State of Illinois, have invented certain new and useful Improvements in Valve-Controlled Couplings, of which the following is a specification.

This invention has relation to coupling means for temporarily effecting and opening a passage between a source of compressed air and a pneumatic vehicle tire.

The object of my invention is to provide an improved valve mechanism within such coupling means. A further object is the provision of convenient means for operating the valve. I also aim to provide an auxiliary valve mechanism so constructed and proportioned as to become effective the instant the primary valve mechanism becomes sufficiently worn to cause leakage of air through the coupling.

These objects and the advantageous features of my invention are hereinafter clearly explained and illustrated in the appended drawings, of which:

Figure 1 is a cross sectional view showing a coupling embodying the invention,

Fig. 2 shows one of the parts of the mechanism illustrated in Fig. 1,

Figs. 3, 4 and 5 illustrate modified forms of valve mechanism.

Referring in the first instance to Fig. 1, the numeral 1 denotes the end portion of a hose extending from a source of compressed air (not shown), and it is shown fixed on a tubular nipple 2, which is integral with and forms part of my device. The body portion 3 of the device is substantially cylindrical in shape and it is, for convenient manipulation, disposed at right angles to the said nipple, whereby the bore 4 of the latter communicates with the bottom portion of a concentric chamber 5 within the body 3. The said chamber is divided into three parts, first the bottom portion just mentioned, then the larger threaded portion in which a threaded nut 6 is seated, and an outer, flaring portion in which is placed a resilient gasket 7, which in turn is held in place by a screw cap 8.

The nut 6 serves a double purpose. It holds an annular valve seat 9 in place against the shoulder 5ª of the chamber, and it is furthermore formed with an inner chamber in which a plunger 10 is slidably fitted. In the bottom portion of the chamber 5 is placed a ball 11 which, by means of a coil spring 12, is held yieldingly pressed against the annular seat 9.

When the above described apparatus is placed on a tire valve, the gasket 7 comes into contact with and closes tightly on to the casing of the said tire valve. Simultaneously the tire valve stem approaches, strikes and advances the plunger 10, which in turn lifts the ball 11 away from the seat 9, thereby permitting air from its source to pass the ball and seat, thence through a series of grooves 10ª of the plunger body 10ᵇ (see also Fig. 2) and finally through the gasket 7 and into the tire valve and tire. Upon removal from the tire valve the spring 12 instantly re-seats the ball.

The valve seat 9 is made of somewhat resilient material and its inner edge, on which the ball lodges, is well rounded. This makes an excellent valve because the ball, in seating, tends merely to expand the seat without cutting into it, as is the case in other forms of valves used for similar purposes. The plunger body 10ᵇ is slidably fitted within the nut 6, while the stem clears both the perforation of the said nut, the annular valve seat, and the gasket 7. The ball, as explained, tends to expand the valve seat, and the tire tends to expand the gasket 7, consequently there is no danger of closing or blocking the air passage at these places. The annular seat 9 is resilient, and the ball pressing against this seat soon closes the valve tightly. Increased pressure, which would tend to injure the seat, were it not resilient, merely causes it to yield somewhat until the ball forces the plunger body against the shoulder of the nut 6, whereby a back-stop is formed which limits the pressure of the ball against the seat. With ample and yet not excessive pressure between the parts and with no cutting edges, this valve is air tight and remains so during the life of the parts.

The modification shown in Fig. 3 consists in adding an auxiliary valve by placing an annular disk 15, of resilient material behind the plunger body 16. The abutting surface of the latter may be made with an annular ridge 16ª, which becomes embedded in the said disk and thereby provides an airtight joint. The parts are so proportioned that this auxiliary valve normally remains open, and it is only brought into service by excessive pressure or when the primary valve seat 17 becomes so worn that the ball 18 enters too far to seat properly and air-tightly. This auxiliary valve is open to the objection of cutting into the valve seat, but being an emergency valve only, this drawback is not so vital.

Nevertheless, in Fig. 4 is shown a form of plunger 19, having a conical surface for engagement with a flaring, conical seat 20. In this structure there are no sharp edges to cut the seat.

In the modified structure illustrated in Fig. 5 the primary valve remains as above described, except that the nut 21 is made somewhat larger so as to accommodate an auxiliary valve seat 22, having the same rounded edges found on the valve seat 9. In this case the plunger body 23 is made with a semispherical surface 23ª for engagement with the said seat 22. In this structure all the excellent features of the primary valve are retained and combined with the advantage of an auxiliary valve mechanism.

I claim:

1. In a tire valve coupling, an annular resilient seat, a ball, a spring for normally holding the ball seated, a slidably fitted plunger within the coupling, for the purpose of unseating the ball, and a back-stop for the said plunger for the purpose of limiting the pressure of the ball on its seat.

2. In a tire valve coupling, an annular resilient seat, a ball, a spring for normally holding the ball seated, a plunger having a stem for unseating the ball and a grooved body fixed to slide within the coupling, and a back-stop for the said plunger body for the purpose of limiting the pressure of the ball against its seat.

3. In a tire valve coupling, a casing having two valve seats disposed in the same direction, a spring held ball normally pressed against the first seat, and a plunger for unseating the said ball, said plunger having a surface for registration with the second valve seat.

4. In a tire valve coupling, a casing, a threaded nut fitted into the casing, an annular resilient valve seat supported by said nut, a ball spring held aginst the said seat, a plunger slidably fitted within the said nut for unseating the ball and having air passages, and a second resilient seat placed within the nut for engagement with an annular surface of the plunger.

In testimony whereof I have hereunto affixed my signature.

JOHN T. H. PATERSON.